July 1, 1958  H. GELLING  2,841,259
DRIVE COUPLING
Filed Dec. 27, 1955
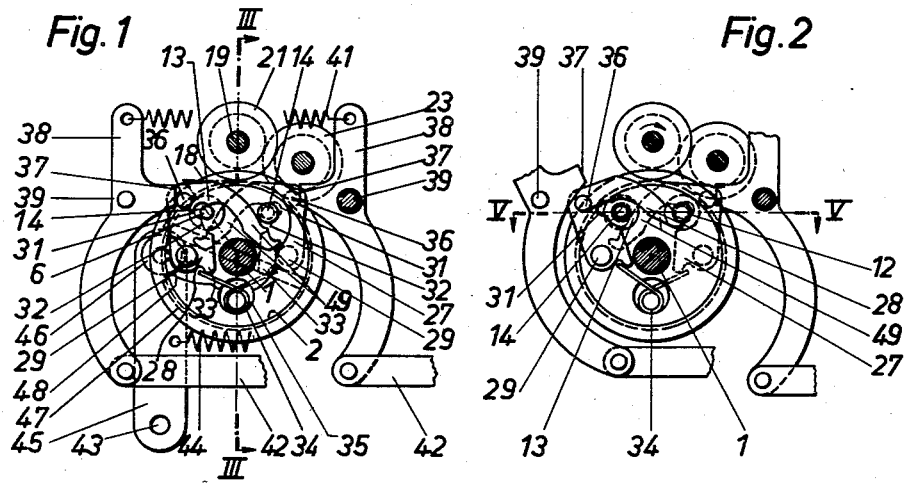
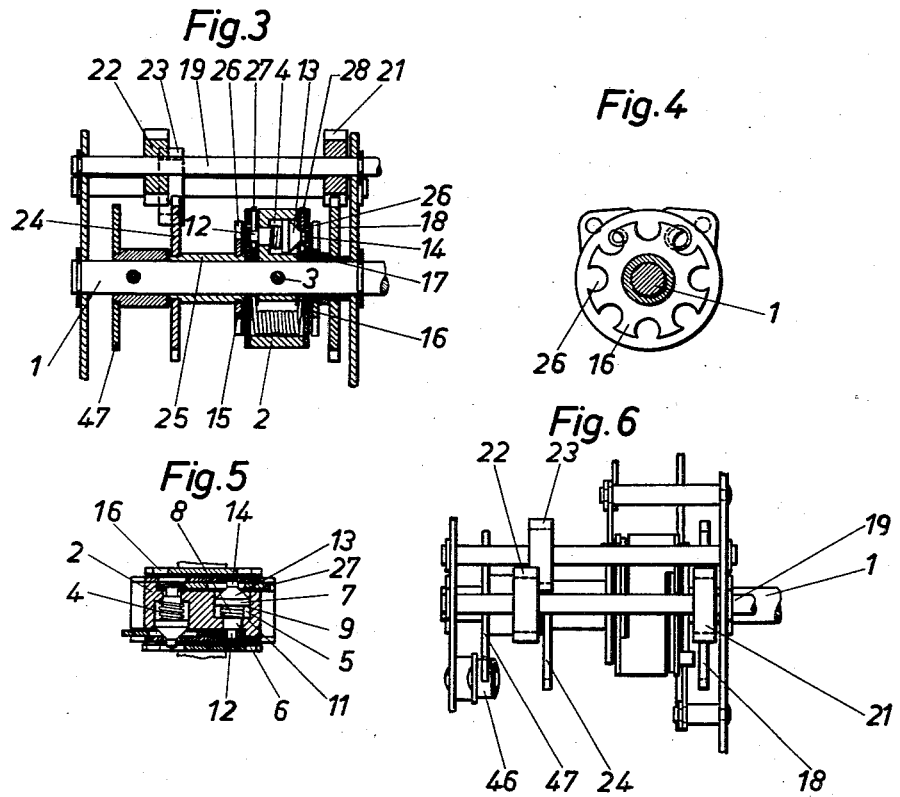
Inventor

United States Patent Office 2,841,259
Patented July 1, 1958

2,841,259

DRIVE COUPLING

Helmut Gelling, Ulm, Germany, assignor to Walther Büromaschinen Gesellschaft m. b. H., Gerstetten, Wurttemberg, Germany, a firm Application December 27, 1955, Serial No. 555,738

Claims priority, application Germany January 8, 1955

6 Claims. (Cl. 192—51)

The invention relates to a drive coupling for full single- and multiple revolutions of shafts to be driven for instance in office-machines, particularly calculating machines, acting in both directions and comprising two drive discs rotated in opposite directions, which will be alternately coupled with the shaft by coupling members adjusted by engaging means.

Drive couplings of such kind may be used not only for the chief-drive shafts of the machines in question but also for drive shafts of partial mechanisms, for instance for the paper carriage or the totalizer slide of a calculating machine.

The object of the invention is to simplify the mentioned drive couplings in their structure and to give them an increased working security. To this end, according to the invention, the coupling members are mounted in form of double bolts at and parallelly movable to the drive shaft, in such a manner, that when being released by their engaging members they mesh under spring action with their drive discs rotatably mounted on the shaft, with the result that the coupling bolts cooperate by means of conical circumferential parts in radial planes of the drive shaft with retaining levers rotating together with the drive shaft and releasing or pressing back said coupling bolts upon their rocking.

Further the two coupling bolts are, according to the invention, provided with a reciprocal blocking device by which on releasing of the one bolt the other is locked against engaging its driving disc. In this blocking device each retaining lever is provided with a projection which on releasing of the lever engages a ring-notch of the coupling bolt for the opposite rotational direction being in the position of rest.

Further features of the invention follow from the following description of an embodiment of the invention.

In the accompanying drawing:

Fig. 1 is a front view of the coupling in the position of rest of the drive shaft.

Fig. 2 is a corresponding view with the shaft to be driven rotating in a counter clockwise direction.

Fig. 3 is a section according to line III—III of Fig. 1.

Fig. 4 is a front view of a drive disc.

Fig. 5 is a section according to the line V—V of Fig. 2.

Fig. 6 is a view from above of the drive coupling.

On the shaft to be driven 1 (Figs. 1 and 3) which actuates the mechanisms in question a coupling cylinder 2 is fixed by a cross pin 3 (Fig. 3) having two stepped borings 4 or 5 (Fig. 5) each having two different diameters in which coupling bolts 6 or 7 are shiftable parallelly to the axis of the drive shaft under the action or against the action of springs 8 supported at the one end by the abutment face 11 of the boring and at the other end by an abutment face 9 of the bolts. The one end of each bolt is provided with a ring-notch 12 the other end with an enlarged conical circumferential part 13 running out into a cylindrical pin 14.

A drive disc 15 or 16 cooperates with the cylindrical pin 14 of each bolt. The drive discs 15, 16 are rotatably mounted on the drive shaft 1 at both sides of the coupling cylinder 2. Correspondingly, the pins 14 of the two coupling bolts and the enlarged parts of the borings 5 are located at opposite front faces of the coupling cylinder. The driving disc 16 (Figs. 3 and 4) is fixed on a hub 17 (Fig. 3) freely rotatably on the drive shaft. On the hub 17 also is mounted a transmitting wheel 18 which meshes with a gear-wheel 21 fixed on the motor-driven shaft 19. On this drive shaft 19 is fixed a second gear-wheel 22, meshing with a transmitting gear-wheel 24 through a gear-wheel 23. The transmitting wheel 24 is fixed to a second drive disc 15, by means of a hub 25 freely rotatably on the shaft to be driven 1. Each drive disc 15, 16 is provided at its circumference, in the manner evident from Fig. 4, with a number of coupling holes 26 from which always one is destined to engage the pin 14 of the appertaining coupling bolt in order to perform the engagement between the coupling disc and the shaft to be driven. The axial movement of the coupling bolt necessary thereto will be effected by retaining levers 27, 28 (Figs. 1, 3) which are located between the front faces of the coupling cylinder 2 and the drive disc 15, 16 and are pivotally mounted by means of pins 29 on the coupling cylinder. These retaining levers 27, 28 cooperate by means of recesses 31 (Fig. 1) and enlargements 32 following them with the pins 14 and the following conical circumferential parts 13 of the coupling bolts. The ends of a cylindrical spiral spring 34 act on lower projections 33 of the levers 27, 28. The spring is located in a boring 35 of the coupling cylinder. Under the action of the spring 34 the levers lean by means of projecting pins 36 against abutment faces 37 of engaging members 38 which are rotatably mounted on pins 39 of the machine frame. They are maintained in the shown position of rest by a spring 41 connecting their upper arms. At the lower ends of the engaging members draw-rods 42 are linked by which they may be turned selectively against the action of the spring 41 into a position releasing the abutment pins 36. According to Fig. 2 the left engaging member 38 is rocked into the engagement position so that the abutment pin 36 is released and accordingly its retaining lever 28 rocked into the shown engagement position under the action of the spring 34.

In the position of rest of the retaining lever 28 shown in Fig. 1 the pin 14 is enabled to engage the narrow recess 31 but this recess retains the conical circumferential part 13 (Fig. 3) so that the pin 14 can not engage its drive disc 16. On the other hand the conical circumferential part 13 of the coupling bolt 6 will be released, according to Fig. 2, by the movement of the retaining lever 28 into the engaging position so that the coupling bolt 6 can move under the action of its spring 8 into the coupling position (Fig. 5) in which it is entered into the coupling hole 26 being just in its reach. The coupling of the constantly motor-driven shaft 19 with the drive shaft 1 therewith is performed in a certain rotational direction. In order to couple the drive shaft in the other rotational direction the other engaging member 38 is to be brought into its engaging position by pulling its draw bar 42.

On stopping the pull of the draw bar 42 the engaging member 38 moves again back into its position of rest represented in Fig. 1. In this position its abutment face 37 is in the path of the abutment pin 36 rotating together with the drive shaft 1, so that on striking the pin 36 against the abutment face 37 the retaining lever 28 will be returned into its position of rest against the action of the spring 34, whereby under the influence of the edges of the narrow recess 31 onto the conical circumferential part 13 of its coupling bolt 6 the latter will be shifted into the disengaging position against the action of the spring 8 thereby bringing about the disengaging between the drive disc 15 and the shaft 1.

According to the length of the span of time during which the pull on the concerning draw bar 42 of the engaging lever will be executed the drive shaft will perform one or more full revolutions. In order to secure the precise position of rest of the drive shaft a lever 45 standing under the action of a spring 44 is mounted at the machine frame by means of a pin 43 (Fig. 1). The lever cooperates by means of a roller 46 with the circumference of a disc 47 secured to shaft 1 and engages resiliently in the position of rest a V-shaped recess 48 of this circumference.

When by stopping one of the pins 36 by the related readjusted abutment 37 the coupling cylinder 2 will not be found precisely in its position of rest, the roller 46, upon engaging into the notch 48 will correct the position of the coupling cylinder by the action of the spring 44. In a new releasing of one of the pins 36 the roller will be yieldingly pressed out of the notch in the beginning of the rotation of the shaft 1.

The retaining levers 27, 28 are provided with projections 49 cooperating with the above mentioned ring-notches of the coupling bolts.

In the position of rest of the coupling device these projections 49 are out of mesh with the ring-notches. When one of the two retaining lever moves into its coupling position, the outer end of its projection 49 engages the ring notch of the coupling bolt for the other rotational direction (see Fig. 2).

Hereby it is attained that always only one coupling bolt for a distinct rotational direction can be moved into the coupling position while the coupling bolt for the other direction is locked against a movement into its coupling position.

What I claim is:

1. In a drive coupling of the class described, a shaft to be driven, two drive discs disposed coaxially with said shaft and loosely mounted thereon, means for rotating said drive discs in opposite directions, a coupling cylinder secured to said shaft between said two oppositely rotating drive discs, two coupling bolts shiftably mounted in said coupling cylinder and designed to be shifted parallelly with said shaft, coupling holes arranged in a circular series in each drive disc, springs tending to move said coupling bolts in opposite directions into engagement with one of the holes of the drive discs, means for retaining each bolt in its disengaged position against the action of its spring, said retaining means being located at opposite sides of the coupling cylinder between said two drive discs, and coupling engaging means for alternatively rendering ineffective said retaining means of one or the other of said coupling bolts, whereby said shaft will be coupled for rotation in one or the other direction.

2. In a drive coupling according to claim 1, said coupling bolts having conical circumferential parts, said retaining means comprising retaining levers mounted on said coupling cylinder and being rockable in radial planes and cooperating with said conical parts of the bolts, whereby upon rocking the retaining levers in one direction the bolts will be released for engagement with the drive discs while upon rocking the retaining levers in the other direction the bolts will be returned into their disengaging position of rest.

3. In a drive coupling according to claim 1, pins fixed to the front faces of said coupling cylinder, said retaining means comprising retaining levers pivotally mounted on said pins, said coupling bolts having conical circumferential parts, said retaining levers having cut-outs widened outwardly and cooperating with said conical parts, a spring tending to move the retaining levers away from the bolts and towards said coupling engaging means situated near the periphery of the coupling cylinder.

4. In a drive coupling according to claim 1, said retaining means comprising retaining levers pivotally mounted on said coupling cylinder, a pin on each retaining lever, said coupling engaging means comprising abutments cooperating with said pins and being disposed to assume a coupling position and a position of rest, a spring tending to rock said retaining levers with their pins towards said abutments, whereby, in the position of rest of the coupling engaging means, the related retaining lever is held engaged with its coupling bolt holding it in its uncoupled position while, in the coupling position of the coupling engaging means, the related abutment is moved away from its coupling bolt allowing the related bolt to move into its coupling position under the action of its spring.

5. In a drive coupling according to claim 1, a reciprocal locking device provided between said two coupling bolts comprising a locking member, actuating means between it and one of the bolts, and a locking connection between it and the other bolt, whereby upon engagement of the bolt into its drive disc the other bolt will be locked against engaging movement and vice versa.

6. In a drive coupling according to claim 1, said retaining means comprising two retaining levers each cooperating with one of said coupling bolt, said retaining levers being pivotally mounted on said coupling cylinder and disposed to assume an effective position on which the related bolt is released for engaging its coupling disc and to assume an ineffective position in which the related bolt is disengaged from its coupling disc, a projection provided at each retaining lever, a ring notch on each coupling bolt cooperating with the projection of the retaining lever for the other coupling bolt, whereby in the effective position of one of the retaining levers the coupling bolt for the other retaining lever is held disengaged from its coupling disc by the engagement of the related projection into its ring-notch and vice versa.

References Cited in the file of this patent
UNITED STATES PATENTS

| | | |
|---|---|---|
| 1,453,298 | Wentworth | May 1, 1923 |
| 2,394,429 | Crosman | Feb. 5, 1946 |